(12) United States Patent
Taswell

(10) Patent No.: US 7,792,836 B2
(45) Date of Patent: Sep. 7, 2010

(54) PORTALS AND DOORS FOR THE SEMANTIC WEB AND GRID

(75) Inventor: Carl Taswell, Ladera Ranch, CA (US)

(73) Assignee: Global TeleGenetics, Inc., Ladera Ranch, CA (US)

( * ) Notice: Subject to any disclaimer, the term of this patent is extended or adjusted under 35 U.S.C. 154(b) by 455 days.

(21) Appl. No.: 11/859,741

(22) Filed: Sep. 21, 2007

(65) Prior Publication Data

US 2008/0313229 A1 Dec. 18, 2008

Related U.S. Application Data

(60) Provisional application No. 60/944,517, filed on Jun. 17, 2007.

(51) Int. Cl.
*G06F 17/30* (2006.01)

(52) U.S. Cl. .................. 707/737; 707/706; 707/713; 707/722; 707/736; 707/758; 707/781; 707/791; 707/802; 707/822; 707/827; 709/217; 709/218; 709/219; 709/202; 709/203; 705/23; 705/26

(58) Field of Classification Search ............... 707/706, 707/713, 722, 737, 736, 758, 781, 791, 802, 707/822, 827, 999.002, 999.003, 999.01, 707/999.107; 709/217, 218, 202, 203, 219; 705/23, 26
See application file for complete search history.

(56) References Cited

U.S. PATENT DOCUMENTS 6,151,624 A * 11/2000 Teare et al. ............... 709/217
6,154,738 A * 11/2000 Call ............................ 707/4
2002/0147738 A1 10/2002 Reader
2003/0099237 A1 5/2003 Mitra et al.
2006/0206586 A1 9/2006 Ling et al.
2006/0253580 A1* 11/2006 Dixon et al. ............... 709/225
2007/0081197 A1 4/2007 Omoigui

OTHER PUBLICATIONS

Title: Global Service Discovery Architecutre Author: Arabshian et al. Date: 2004 Publisher: Department of Computer Science, Columbia University, New York, NY Pertinent pp. 7.*

* cited by examiner

*Primary Examiner*—Syling Yen

(57) ABSTRACT

A Domain Ontology Oriented Resource System (DOORS) and a Problem Oriented Registry of Tags And Labels (POR-TAL) are infrastructure systems for resource metadata within a paradigm serving as a bridge between the original web and the semantic web. IRIS registers domain names while DNS publishes domain addresses with mapping of names to addresses for the original web. Analogously, PORTAL registers resource labels and tags while DOORS publishes resource locations and descriptions with mapping of labels to locations for the semantic web. They provide an analogous resource label system, semantic search applications, and the benefits of collaborative semantic networks. Advertising is supported in several ways. Businesses purchase the right to display their products or services in association with searches. Also, content providers accept placement of advertising. Ads are then selected for display based on the content displayed utilizing the invention to match service providers with advertisers.

8 Claims, 4 Drawing Sheets

PORTALS AND DOORS FOR THE SEMANTIC WEB AND GRID

CROSS REFERENCE TO RELATED APPLICATIONS

This application claims priority from our provisional patent applications titled: "DOORS to the Semantic Web and Grid with a PORTAL for Biomedical Computing" with Ser. No. 60/944,517 filed Jun. 17, 2007.

FIELD OF THE INVENTION

The present invention generally relates to managing online metadata about online and offline resources, i.e., managing online data that locates and describes resources which may be either online or offline. More specifically, as a resource metadata management system, the invention provides a mechanism for addressing the internet and accessing the semantic web and grid.

BACKGROUND OF THE INVENTION

Humans are capable of using the World Wide Web to carry out tasks such as finding the Finnish word for "car", to reserve a library book, or to search for the cheapest DVD and buy it. However, a computer cannot accomplish the same tasks without human direction because web pages are designed to be read by people, not machines. The semantic web is a vision of information that is understandable by computers, so that they can perform more of the tedious works involved in finding, sharing and combining information on the web.

For example, a computer might be instructed to list the prices of flat screen HDTVs larger than 40 inches with 1080p resolution at shops in the nearest town that are open until 8 pm on Tuesday evenings. Today, this task requires search engines that are individually tailored to every website being searched. The semantic web provides a common standard for websites to publish the relevant information in a more readily machine-processable and integratable form.

Tim Berners-Lee originally expressed the vision of the semantic web as follows: "I have a dream for the Web [in which computers] become capable of analyzing all the data on the Web—the content, links, and transactions between people and computers. A 'Semantic Web', which should make this possible, has yet to emerge, but when it does, the day-to-day mechanisms of trade, bureaucracy and our daily lives will be handled by machines talking to machines. The 'intelligent agents' people have touted for ages will finally materialize".

Semantic publishing will benefit greatly from the semantic web. In particular, the semantic web is expected to revolutionize scientific publishing, such as real-time publishing and sharing of experimental data on the Internet. This simple but radical idea is now being explored by W3C HCLS group's Scientific Publishing Task Force.

Tim Berners-Lee has further stated: "People keep asking what Web 3.0 is. I think maybe when you've got an overlay of scalable vector graphics—everything rippling and folding and looking misty—on Web 2.0 and access to a semantic Web integrated across a huge space of data, you'll have access to an unbelievable data resource".

The semantic web is an evolving extension of the World Wide Web in which web content can be expressed not only in natural language, but also in a form that can be read and used by software agents, thus permitting them to find, share and integrate information more easily. It derives from W3C director Tim Berners-Lee's vision of the Web as a universal medium for data, information, and knowledge exchange.

Currently, navigation across the World Wide Web is primarily via use of locational information, typically via a Universal Resource Locator (URL), Universal Resource Identifier (URI), etc. Thus, for example, some of the previous section of text came from Wikipedia, and had a URL of:

http://en.wikipedia.org/wiki/Semantic_Web

That Wikipedia URL was obtained through use of the Google search engine with a search string consisting of "Semantic Web". Search engines like Google have electronic spiders climbing the World Wide Web looking for web pages, and when they are found, indexing them. Links to these web pages are then provided search engine users based on proprietary algorithms that take into account the proximity and frequency of the search terms and the frequency that the different web pages containing those search terms are accessed. Notably though, the searching is almost entirely context free. The relationship between search terms means nothing to the search engine, but is rather an attempt by the users to find some set of words that are somewhat uniquely included in the objects that he seeks.

Once a search engine has provided a user with a URL or other alphanumeric location identifier, a translation is made between that URL and a computer understandable routing address typically utilizing a Domain Name Server (DNS). On the Internet, the Domain Name System (DNS) associates various sorts of information with so-called domain names; most importantly, it serves as the "phone book" for the Internet: it translates human-readable computer hostnames, e.g. en.wikipedia.org, into the IP addresses that networking equipment needs for delivering information. It also stores other information such as the list of mail exchange servers that accept e-mail for a given domain. In providing a worldwide keyword-based redirection service, DNS is an essential component of contemporary Internet use.

The most basic use of DNS is to translate hostnames to IP addresses. It is in very simple terms like a phone book. For example, if you want to know the internet address of en.wikipedia.org, DNS can be used to tell you it's 66.230.200.100. DNS also has other important uses.

Pre-eminently, the DNS makes it possible to assign Internet destinations to the human organization or concern they represent, independently of the physical routing hierarchy represented by the numerical IP address. Because of this, hyperlinks and Internet contact information can remain the same, whatever the current IP routing arrangements may be, and can take a human-readable form (such as "wikipedia.org") which is rather easier to remember than an IP address (such as 66.230.200.100). People take advantage of this when they recite meaningful URLs and e-mail addresses without caring how the machine will actually locate them.

The DNS also distributes the responsibility for assigning domain names and mapping them to IP networks by allowing an authoritative server for each domain to keep track of its own changes, avoiding the need for a central registrar to be continually consulted and updated.

The domain name space consists of a tree of domain names. Each node or leaf in the tree has one or more resource records, which hold information associated with the domain name. The tree sub-divides into zones. A zone consists of a collection of connected nodes authoritatively served by an authoritative DNS name server. (Note that a single name server can host several zones.)

When a system administrator wants to let another administrator control a part of the domain name space within his or her zone of authority, he or she can delegate control to the other administrator. This splits a part of the old zone off into a new zone, which comes under the authority of the second administrator's nameservers. The old zone becomes no longer authoritative for what comes under the authority of the new zone.

A resolver looks up the information associated with nodes. A resolver knows how to communicate with name servers by sending DNS requests, and heeding DNS responses. Resolving usually entails iterating through several name servers to find the needed information.

Some resolvers function simplistically and can only communicate with a single name server. These simple resolvers rely on a recursing name server to perform the work of finding information for them.

Users generally do not communicate directly with a DNS resolver. Instead DNS resolution takes place transparently in client applications such as web browsers, mail clients, and other Internet applications. When a request is made which necessitates a DNS lookup, such programs send a resolution request to the local DNS resolver in the operating system which in turn handles the communications required.

The DNS resolver will almost invariably have a cache containing recent lookups. If the cache can provide the answer to the request, the resolver will return the value in the cache to the program that made the request. If the cache does not contain the answer, the resolver will send the request to a designated DNS server or servers. In the case of most home users, the Internet service provider to which the machine connects will usually supply this DNS server: such a user will either have configured that server's address manually or allowed DHCP to set it; however, where systems administrators have configured systems to use their own DNS servers, their DNS resolvers often point to separately maintained name servers of the organization. In any event, the name server thus queried will follow the process outlined above, until it either successfully finds a result or does not. It then returns its results to the DNS resolver; assuming it has found a result, the resolver duly caches that result for future use, and hands the result back to the software which initiated the request.

The system outlined above provides a somewhat simplified scenario. The DNS includes several other functions:

Hostnames and IP addresses do not necessarily match on a one-to-one basis. Many hostnames may correspond to a single IP address: combined with virtual hosting, this allows a single machine to serve many web sites. Alternatively a single hostname may correspond to many IP addresses: this can facilitate fault tolerance and load distribution, and also allows a site to move physical location seamlessly.

There are many uses of DNS besides translating names to IP addresses. For instance, Mail transfer agents use DNS to find out where to deliver e-mail for a particular address. The domain to mail exchanger mapping provided by MX records accommodates another layer of fault tolerance and load distribution on top of the name to IP address mapping.

Sender Policy Framework and DomainKeys instead of creating own record types were designed to take advantage of another DNS record type, the TXT record.

To provide resilience in the event of computer failure, multiple DNS servers provide coverage of each domain. In particular, more than thirteen root servers exist worldwide. DNS programs or operating systems have the IP addresses of these servers built in.

The DNS uses TCP and UDP on port 53 to serve requests. Almost all DNS queries consist of a single UDP request from the client followed by a single UDP reply from the server. TCP typically comes into play only when the response data size exceeds 512 bytes, or for such tasks as zone transfer. Some operating systems such as HP-UX are known to have resolver implementations that use TCP for all queries, even when UDP would suffice.

The typical result of a DNS lookup is a machine understandable address for one or more machines somewhere in the world. Most often, this is an Internet Protocol (IP) address, typically presented in IP level 4 as four numbers, each number separated from the others by a period ("."). However, the underlying IP level 4 IP address is actually a thirty-two bit value, with each of the four numbers in the human readable form representing an eight bit number as a decimal integer. Because the 32 bit IP Version 4 address space is insufficient for the expected growth of the WWW, IP Version 6 has been designed to have a 128 bit addressing space. Nevertheless, as far as DNS is concerned, the IP Version 6 addresses are functionally equivalent to IP Version 4 addresses, and are functionally the machine readable addresses used to access a remote system.

IP is a low level protocol utilized to route between two systems over the Internet and within intranets. Logically situated above the IP protocol is typically either the User Datagram Protocol (UDP) or Transmission Control Protocol (TCP). Both TCP and UDP utilize "ports" to communicate between different applications on the various systems. Some of the better known port numbers are 53 for DNS and 80 for the HTTP (i.e. web browsers).

It is the responsibility of these applications to finish the interpretation and routing of URLs and URIs. Thus, in the example given above of: http://en.wikipedia.org/wiki/Semantic_Web, the "http" determines the destination application. This is typically translated into port 80 for "http". DNS will then generate a TCP address for "en.wikipedia.org", which is currently 66.230.200.100 (IP V4). Finally, the application listening to port 80 at IP address 66.230.200.100 will interpret the remainder of the URL, in this case: "wiki/Semantic_Web", to provide the requested information about the semantic web in Wikipedia.

Note that addressing across the Internet today is essentially done absent semantics and context. This was done intentionally, since it provides a very simple, universal, method of accessing content of any imaginable type. Nevertheless, it is proving to be inadequate to the growing complexity of the information on the World Wide Web. The attempts in the past to utilize semantic information to identify and access desired information across the World Wide Web have yet been successful. In particular, a comprehensive integrated solution to the Semantic Web would be highly desirable.

BRIEF SUMMARY OF THE INVENTION

The semantic web remains in the early stages of development. It has not yet achieved the goals envisioned by its founders as a pervasive web of distributed knowledge and intelligence. Success will be attained when a dynamic synergism can be created between people and a sufficient number of infrastructure systems and tools for the semantic web in analogy with those for the original web. The domain name system, web browsers, and the benefits of publishing web pages motivated many people to register domain names and publish web sites on the original web. An analogous resource label system, semantic search applications, and the benefits of collaborative semantic networks will motivate people to register resource labels and publish resource descriptions on the semantic web. The Domain Ontology Oriented Resource System (DOORS) and Problem Oriented Registry of Tags And Labels (PORTAL) provide infrastructure systems for resource metadata within a paradigm that can serve as a bridge between the original web and the semantic web. IRIS registers domain while DNS publishes domain addresses with mapping of names to addresses for the original web. Analogously, PORTAL registers resource labels and tags while DOORS publishes resource locations and descriptions with mapping of labels to locations for the semantic web.

PORTAL-DOORS can be utilized in advertising in several ways. In one example, businesses can purchase the right to display their product or service in association with PORTAL-DOORS searches for particular labels, tags, descriptions, semantic concepts, etc. In another example, content providers accept placement of advertising on their web pages. Ads are selected for display based on the content displayed utilizing PORTAL-DOORS to match service providers with advertisers.

DETAILED DESCRIPTION OF THE INVENTION

I. Introduction

Figure 1:
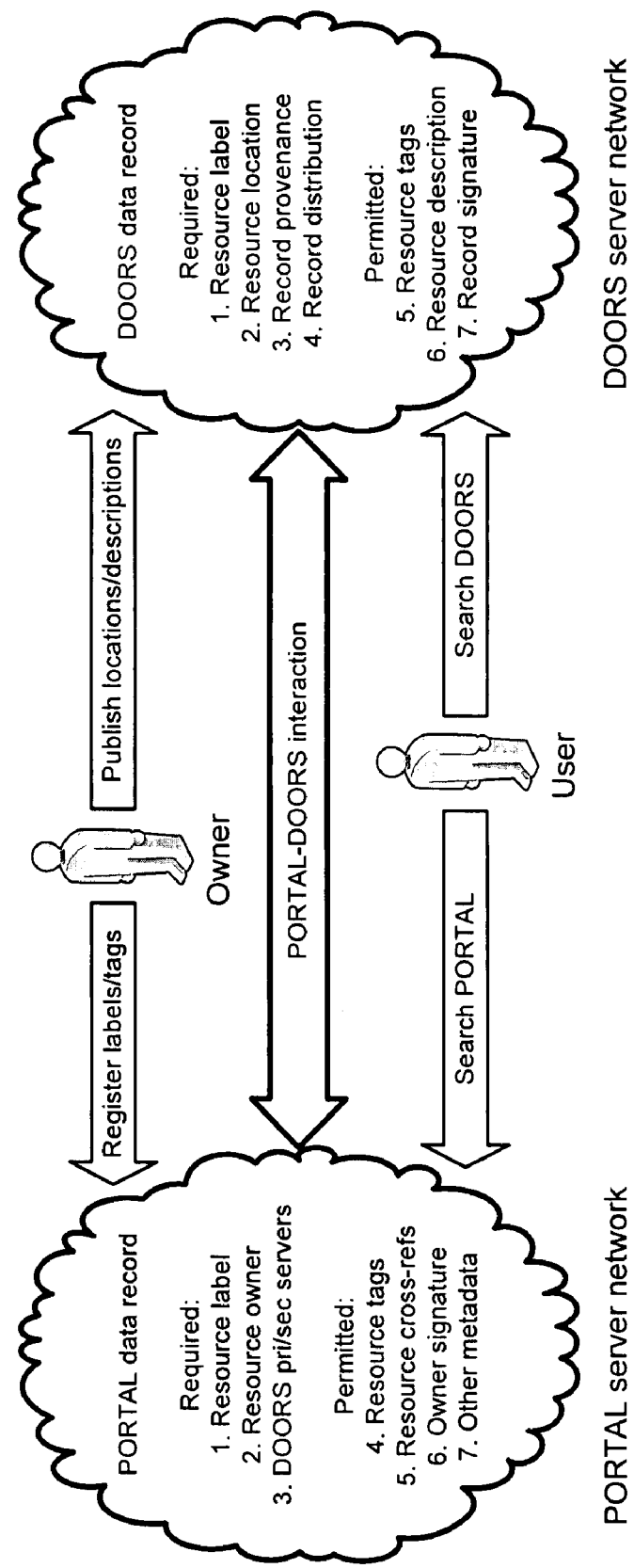
FIG. 1 is a diagram summarizing the basic structure of an exemplary DOORS data record with both required and permitted fields, in accordance with one embodiment of the present invention.

Devising more effective technologies and productive systems to accelerate the growth of the semantic web and grid remains a fundamental challenge for internet engineers. In response to this challenge, this disclosure reports novel technologies called the Domain Ontology Oriented Resource System (DOORS) and the Problem Oriented Registry of Tags And Labels (PORTAL) intended for use with resource metadata. DOORS and PORTAL have been designed within a novel paradigm focused on labeled resources in analogy with existing internet systems focused on named domains. This disclosure further elaborates a prototype registry called BioPORT that is specific for the problem domain of biomedical computing. For cross-registry compatibility, problem domain specific registries such as BioPORT are designed to comply with the requirements of the generic root registry within the PORTAL system. These registries are proposed with scientific problem oriented designs that avoid the engineering technology oriented restrictions of existing registries.

Sections II-VI review the background and motivation for DOORS, PORTAL, and BioPORT. Section II explains key concepts of the current semantic web and grid, and summarizes how they are driving the transformation of software architecture from designs based on closed-world computing to those based on open-world computing. Section III reviews the literature and current state-of-the-art in the life sciences web and grid, and summarizes the opinions of leading commentators in the bioinformatics community on existing barriers that impede development. Section IV defines the meaning and scope of biomedical computing as interpreted in this disclosure for BioPORT, and provides further motivation justifying the need for a new kind of metadata registry in biomedical computing. Sections V and VI review existing technologies, respectively, for domain naming and registering systems (including the Domain Name System (DNS), Internet Registry Information System (IRIS), etc.) and for resource identifying and linking systems (including Uniform Resource Identifier (URI), Persistent Uniform Resource Locator (PURL), etc.) that serve as inspirations and/or foundations for DOORS and PORTAL. Sections VII and VIII present the central novel contribution of this disclosure. Section VII provides a detailed exposition of the design principles and requirements necessary for both DOORS and PORTAL server functions and data records to operate as an effective infrastructure for registering resource labels and tags and publishing resource locations and descriptions intended for use by other semantic systems and applications. Similarly, Section VIII provides a description of the design principles and requirements for BioPORT as a registry for biomedical computing within the PORTAL-DOORS framework. Sections IX-XIII provide further analysis and discussion of issues essential to DOORS and PORTAL. Section IX clarifies distinctions between the resource labels used in DOORS and PORTAL and the domain names used in DNS and IRIS. Section X discusses the importance of synergistic systems comprised of synergies created not only amongst technology components but also between technologies and people necessary for the growth of the semantic web. Section XI discusses the importance of semantic search applications including their expected use within translational medicine. Section XII summarizes DOORS and PORTAL describing it as a hybrid with which to bootstrap and bridge from the original web to the semantic web. Section XIII summarizes some of the key advantages of DOORS and PORTAL in comparison with other systems. Section XIV discusses the use of PORTAL and DOORS for advertising. Section XV provides disclosure of information that is not directly PORTAL and DOORS related, but is rather included for support of claims. Section XVI provides a table containing references cited in this disclosure.

This disclosure has been divided into sections for ease of understanding, only, and the section titles should not be understood as limiting the invention. A single implementation of the system has been disclosed. However, it should be understood that the present invention is not limited to the specifics in that implementation. Also, the remainder of this disclosure contains references to articles, etc., indicated by "[x]", where "x" is a positive integer. Citations to the actual articles, etc. are listed in a table in Section XVI. These references are cited for informational purposes only and done in this format to ease readability.

II. Semantic and Open-World Computing

Recognized as the inventor of the world wide web, and now the director of the World Wide Web Consortium [1], Berners Lee has refocused his attention on development of the semantic web [2] and creation of a science of the web [3]. The semantic web extends the original web with technologies that provide syntactic structure (the extensible markup language XML [4]) and semantic meaning (the resource description framework RDF [5]) permitting the development of taxonomies and inference rules. When combined together as description logics languages (the DL variant and recent E and Eu extensions [6] of the web ontology language OWL [7]), they enable the compilation of knowledge representations or information collections known as ontologies [8], [9]. Several recent books [10]-[12] provide a comprehensive introduction to this rapidly changing field of semantic computing.

Regarding information, Berners-Lee et al. [3] observe that most data remains inaccessible (either hidden or locked in closed storage systems without communicating interfaces) rather than distributed via an open network of inter-referring resources. Regarding people, they note that scientists depend increasingly on the web but do not interact sufficiently with web technologists in a manner that would enable the engineers to build systems more suitable for use by the scientists. As a consequence, Berners-Lee et al. [3] conclude that accelerating the growth of the semantic web requires the development and support of a new interdisciplinary field called web science. They emphasize that this new field involves engineering novel infrastructure protocols and systems, developing more productive applications and user interfaces, and understanding the communities that use them.

A fundamental tenet underlying the web remains the open-world assumption that the computing environment is intrinsically open and continuously changing. However, traditional software development was based on a closed-world assumption. Baresi et al. [13] discuss the evolution of software architectures from being "static, monolithic, and centralized" in the closed-world setting to "dynamic, modular, and distributed" in the open-world setting. They provide an excellent summary of open-world computing with a review of existing solutions (including web services, publish/subscribe middleware, grid computing, and autonomic computing) and an outline for a research agenda (addressing specification, verification, monitoring, trust, implementation, and self-management). Zhuge [14], [15] provides another view of open-world computing with attention to its future interconnection environment, semantic grid, and e-science knowledge grid.

III. The Life Sciences Web and Grid

Biomedical ontologies have benefited from significant development in the bioinformatics and clinical informatics communities [16]-[18]. In bioinformatics, the journal Nucleic Acids Research features an annual Web Server Issue and an annual Database Issue. Recent articles include those on EBI's resources [19], NCBI's resources [20], the molecular biology database collection [21], the bioinformatics links directory [22], and the online bioinformatics resources collection [23]. Philippi and Kohler [24], [25] discuss the many problems impeding the semantic integration of these life science databases and ontologies. Asking the question "A life science semantic web: Are we there yet?", Neumann [26], [27] provides another perspective featuring the Life Science Identifier (LSID) proposed standard [28], the Haystack semantic browser [29], and other initiatives such as the W3C Semantic Web Health Care and Life Sciences Interest Group [30]. These influences have shaped the development of his prototype semantic web application BioDash [27] for drug discovery in pharmacogenomics and personalized medicine.

Cannata et al. [31] call for organization of the "bioinformatics resourceome" arguing that investigators should have a comprehensive directory of algorithms, databases, and literature with sufficient annotation to facilitate appropriate use of the listed resources. They recommend development of a distributed system for describing the availability and reliability of these resources. They envision a resource metadata system that would answer questions regarding the current location and availability of a resource and its quality as measured by objective benchmarks or subjective ratings.

Extending beyond bioinformatics to the wider expanse of all biomedical research, Buetow [32] reviews examples from the developing biogrid including myGrid [33], BIRN [34], and caBIG with caCORE [35]. He observes that biomedical informatics remains heterogeneous and serves disconnected medical, scientific, and engineering communities. He explains further that these communities speak different languages resulting in communication barriers that slow the cross-disciplinary transfer of knowledge. Considering existing technology alternatives including peer-to-peer systems, web services, and grid computing, he concludes that current efforts "have not yet crossed the threshold of demonstrated value."

Buetow [32] recommends that a cyberinfrastructure of the future should a) transition smoothly from the current to future infrastructures, b) adhere to open standards that promote platform agnosticism (i.e., neutrality and independence), c) manage identity and control access, and d) track data provenance, intellectual property, and academic credit. Most importantly, he admonishes against building a new infrastructure that simply replaces current silos with future cybersilos.

With another view in the larger context of e-science and e-business, DeRoure et al. [36], [37] discuss their vision of the future infrastructure for the semantic web and grid. They provide a detailed review of requirements from "resource description, discovery, and use" to "integration with legacy IT systems" applicable in general. However, they also discuss several important case studies relevant to health care and the life sciences such as combinatorial chemistry, medical imaging, and medical devices [37].

IV. Biomedical Computing

Bioinformatics and computational biology, biomathematics and mathematical physiology, or biostatistics and epidemiology are examples of pairs of related fields that have distinguishing definitions carefully crafted by the specialists in each of these related fields. In contrast, biomedical computing is defined here for the purposes of declaring the scope of BioPORT in Section VIII as the most general and comprehensive term referring to any multi-disciplinary field that combines aspects of both the computational and life sciences.

Biomedical computing applies tools and methods from the computational world to answer questions in the biomedical world whether to discover and understand the nature of life or to promote health and prevent disease. In the sense of biomimicry [38], biomedical computing builds models of the animate world as a means of engineering systems in the inanimate world intended to emulate the efficiencies of nature created by evolution. Encompassing many alternative perspectives, a generalized definition of biomedical computing must incorporate all theoretical, computational and experimental scientific and engineering approaches to the fusion of computers and computing with biology and medicine.

This generalized view extends analogously to computing itself defined here as execution by a machine of a program comprised of algorithms operating on data without regard to type of data (numeric, symbolic, multimedia, etc.), class of algorithm (numerical simulation, database query, logical reasoning, computational complexity, etc.), machine (calculator, workstation, grid, etc.), platform (processor, operating system, programming language), implementation (hardware, firmware, software), director (human, software agent, other machine), or underlying theory (whether from mathematics, statistics, informatics, etc.). According to this multi-perspectived view of computing, a resource can be anything from a simple utility that runs on a calculator isolated from the internet to a sophisticated application that only runs on a distributed grid of supercomputers or massively parallel processing nodes.

Yet, as noted by Cannata et al. [31], scientists cannot necessarily find appropriate available resources even in their own fields of specialization. Moreover, in the life sciences as reviewed in Section III, most resource directories remain technocentric in the sense that each tends to collect information about resources of only one kind such as database or web server rather than all kinds of computing resources (including those not dependent on the internet for operation) that might be relevant to the scientist's field of inquiry.

In order to prevent the replacement of current silos with future cybersilos forewarned by Buetow [32], a system of registries and directories for resources should be built in a manner analogous to that for the domain name system (DNS) [39]-[41] constructed for domain names. Thus, it would be unrestricted by either computing resource or application field just as DNS was unrestricted (see Section V). If successful, then a neuropharmacologist should be able to search a biochemistry or bioinformatics directory just as readily as a cardiologist might search an electrophysiology or cardiovascular drug trials directory. Each specialist should be able to conduct cross directory searches in related fields and find any relevant resource of interest whether a simple spreadsheet macro or an ontology-based expert system, regardless of location of the directory or registry governing the data record found for the resource metadata.

V. Domain Naming and Registering Systems

Purposeful avoidance of any requirement for the client or user to possess prior knowledge of a domain name's governing registry or authoritative directory (with the latter better known in DNS as a primary name server) has significantly contributed to the overwhelming success of DNS. With antecedents appearing as early as 1983 and IETF RFC 1035 approved as IETF Standard 13 in 1987 [39], DNS remains one of the most important pillars supporting the infrastructure of the internet and the growth of many protocols (telnet, gopher, ftp, etc.) of which the most user-friendly and influential has been http spurring the growth of the web [40].

In simplest terms, DNS maps domain names (registered separately at a governing registry managed by a registrar) to numeric addresses identifying internet locations. DNS operates with a system of root servers, authoritative primary servers, and non-authoritative secondary servers known as name servers that, when accessed by clients known as resolvers, interact with recursive forwarding, caching, and 'time-to-live' expiring, respectively, for querying, storing, and expunging record data. DNS has been further enhanced with support for security with DNS extensions implemented as DNSSEC [42], [43] and for multilingualism with internationalized domain names implemented as IDNA and the IDN standards [44], [45]. Despite the recent popularity of peer-to-peer technologies, it is difficult to imagine how a peer-to-peer based alternative could reproduce the success of DNS and its enhancements DNSSEC and IDNA without its associated hierarchy of clients, caching servers, authoritative servers, and governing registries.

Originally motivated by the desire to build a replacement for the aging whois protocol [46], the IETF Cross Registry Information Service Protocol (CRISP) Working Group has been chartered [47] to define a standard mechanism that can be used for . . .
  finding authoritative information associated with a label
    [and] a protocol to transport queries and responses for
    accessing that information . . . [which] provides uniform
    access to and view of data that may be held in disparate
    backend servers . . . .

for registries [48]. The CRISP Working Group has already completed the initial draft iris1 [49] of the Internet Registry Information Service (IRIS) Core Protocol, and drafts dreg1 [50] and areg1 [51] of several IRIS-dependent protocols for different types of registries. If approved, a pending update to IRIS called IRIS-XPC [52] will replace IRIS-BEEP [53] by specifying XML pipelining with chunks (XPC) as the new default transport for IRIS and by providing full support for security and international languages. IETF's CRISP [48] should not be confused with NIH's Computer Retrieval of Information on Scientific Projects [54]. Similarly, IETF's IRIS [49] should not be confused with the Interoperability and Reusability of Internet Services [55] or the International Rice Information System [56].

VI. Resource Identifying and Linking Systems

As the core protocol for CRISP, IRIS has been designed to associate authoritative information with any arbitrary kind of label as declared and defined by the particular registry type (see examples [50], [51]). Theoretically, a label may be anything from a simple tokenized name to a more complex Uniform Resource Identifier (URI) [57] or Internationalized Resource Identifier (IRI) [58]. These identifiers may specify either abstract or physical resources, neither of which are required to be accessible via the internet. A URI that is resolvable to an internet location is commonly known as a Uniform Resource Locator (URL) [59]. However, even a URI serving as an XML namespace identifier with the form http://www-.domain.org/namespace/ that appears as if it might also be a URL, and thus might resolve to a web site, is not required to do so.

Such namespace URIs are often associated with internet accessible web site directories that contain a collection of related resources supporting the namespace. The Resource Directory Description Language (RDDL) [60], built as an extension of XHTML [61] and XLink [62] with an added element resource, has been developed to provide both human- and machine-readable information describing the nature, purpose, and location of each resource in the directory with links to the resources targeted by the namespace URI.

RDDL with XLink may be related to the semantic web but does not constitute one of its inherent components; see [63] for a discussion of conversion from XLink-based resources to RDF-based resources more appropriate for the semantic web. The problem of interlinking and crosslinking resources has also been addressed by an independent consortium on XML Topic Maps with its XTM specification [64].

A solution to another problem, that of persistent versus transient links, has been provided by the Online Computer Library Center (OCLC) with its PURL System (www.purl.org) for Persistent Uniform Resource Locators [65]. The PURL system remains non-proprietary and available for use without fees. In contrast, the Handle System (www.handle.net) has been patented by the Corporation for National Research Initiatives (CNRI) and does require registration and annual service fees. However, the Handle System [66], [67] provides a higher level of security than the PURL System. None of these linking systems (whether RDDL, XTM, PURL, or Handle) have been built with RDF and OWL enabling machine-understandable semantic relationships between linked resources.

However, continuing refinements of RDFS and the mapping between RDF and OWL [68] strengthen RDF and OWL as the de facto languages of the semantic web. Therefore, none of the linking systems reviewed in this section can serve currently as infrastructure components immediately and directly suitable for the semantic web without first being revised and rebuilt with RDF/OWL and then appropriately embedded in semantic systems.

VII. PORTAL and DOORS

As a protocol to facilitate interoperability of registries and registrars, CRISP with its core IRIS (in its current draft form with core protocol iris1 [49], [52] and main registry type dreg2 [69]) has been built primarily for the original web with a focus on the domain names of DNS. Extensions of IRIS and analogues of DNS can also be developed for the semantic web and grid with a focus on labeled resources instead of named domains. Thus, basic principles and requirements for data records and server functions are proposed here for a new infrastructure technology as an extension and analogue of the existing IRIS-DNS framework. In this novel paradigm, the Problem Oriented Registry of Tags And Labels (PORTAL) operates as a resource label and tag registering system (i.e., IRIS extension) and the Domain Ontology Oriented Resource System (DOORS) operates as a resource location and description publishing system (i.e., DNS analogue).

Both the IRIS-DNS and PORTAL-DOORS frameworks can be viewed as analogous paradigms serving respectively the original web and the semantic web. The following Table compares some of the similarities and differences of these paradigms from the perspective of considering both as distributed hierarchical database systems with entity-attribute registering and publishing. Detailed requirements of the PORTAL-DOORS paradigm are elaborated further in Sections VII-A to VII-E.

|  | IRIS-DNS | PORTAL-DOORS |
| --- | --- | --- |
| Registering system | IRIS | PORTAL |
| Entity registered | domain | resource |
| Identified by | unique name | unique label with optional tags |
| Publishing system | DNS | DOORS |
| Attributes published | address and aliases | location and description |
| Specified by | IP number | URIs, URLs, ontologies, and semantic statements |
| Forwards requests | Yes | Yes |
| Caches responses | Yes | Yes |
| Serves original web | Yes via mapping of character name to numeric address | Yes via mapping of character label to URLs for IRIS-DNS |
| Serves semantic web | No | Yes via mapping of character label to semantic description |
| Crosslinks entities | No | Yes via mapping within description to other resources |

It should be noted that in the preferred implementation of the present invention, PORTAL would be implemented as an extension of IRIS, while DOORS would be implemented as an extension of an analogue of DNS. However, other implementations and embodiments are also within the scope of the present invention, including PORTAL implemented as an extension of an analogue of IRIS and/or DOORS implemented as an extension of DNS.

A. DOORS Data Records

FIG. 1 is a diagram summarizing the basic structure of an exemplary DOORS data record with both required and permitted fields, in accordance with one embodiment of the present invention. Minimizing requirements remains imperative during the transition from original web to semantic web. Thus, resource label servers (as the analogues in DOORS of the domain name servers in DNS) should maintain database records with the following required metadata for each resource:

1) the resource label with a globally unique URI (or IRI) enabling non-semantic string queries of labels;
2) the resource location with a URL (or IDN), possibly the same as the URI (or IRI) if resolvable, and any associated URLs (or IDNs) as explained in Section VII-C, enabling query responses;
3) the record provenance with identification of the a) resource owner, b) authoritative master PORTAL registry, and c) authoritative primary DOORS server;
4) the record distribution with parameters for 'time-to-live' caching and expiring as well as extent of redistribution for non-authoritative secondary DOORS servers.

Given the operational features of both DOORS and PORTAL described respectively in Sections VII-C and VII-D, resource label servers should also maintain records with the following permitted metadata for each resource:

5) the resource tags, if registered at the governing registry, including a tokenized name and/or phrases enabling non-semantic string queries of tags;
6) the resource description with an RDF mini-document, a collection of RDF triples that reference OWL ontologies, enabling semantic reasoning queries of descriptions;
7) the record signature with XML-Signatures [70] for the a) resource owner, b) authoritative master PORTAL registry, and c) authoritative primary DOORS server.

As an informal demonstrative example, consider the following DOORS pseudo-record for a software application:

1) resource label: "http://biomedicalcomputing.org/elida";
2) resource location: "http://www.ellitron.com";
3) record provenance: a) resource owner: "Carl Taswell", b) PORTAL master: "portal.biomedicalcomputing.org", c) DOORS primary: "doors.biomedicalcomputing.org";
4) record distribution: a) expiration time-to-live: "7 days", b) redistribution extent: "all servers";
5) resource tags (non-semantic strings): "ELIDA", "limiting dilution assays", "biologically active particles"
6) resource description (semantic statements): "ELIDA is downloadable freeware", "ELIDA runs on workstations", "ELIDA implements algorithms published in [71]", "ELIDA analyzes limiting dilution assay data", "ELIDA quantitates biologically active particles".

This exemplary informal pseudo-record example contains the required unique label, three optional tags (of which the first is a tokenized name), and five semantic statements in the description. The label and tags can be searched with a non-semantic string query while the description can be searched with a semantic reasoning query. A formal version of this record would be found at a DOORS server by a semantic search for "free software that analyzes limiting dilution assay data" initiated by a biologist at a DOORS client. For implementation of the formal DOORS record as a valid XML document containing within itself a valid RDF mini-document for the semantic description, the five statements in this example should be expressed as RDF triples referencing OWL ontologies.

By requiring a DOORS record to reference its governing PORTAL registry, the DOORS server can access the schemas enforced for the record's XML document and its RDF mini-document. Whenever resource metadata is stored or updated by the owner in records at the DOORS server, the metadata should always be validated for compliance with any schema imposed by the registry type of the governing registry. This design enables any DOORS server to maintain resource records governed by different PORTAL registries of varying specific PORTAL registry types all of which must comply with the generic PORTAL registry type (see Section VIID). Usage patterns will determine which servers accumulate records governed by which specific registry types.

B. PORTAL Data Records

FIG. 1 also displays the basic structure of a PORTAL data record with required and permitted fields. This structure is designed with the same principle of minimizing requirements as used in Section VII-A for DOORS data records. Thus, resource label registries (as the analogues in PORTAL of the domain name registries in IRIS) should maintain database records with the following required metadata for each resource:

1) the resource label with a globally unique URI (or IRI) required by the generic PORTAL registry type for identification of the resource in PORTAL-DOORS;
2) the resource owner with contact information for the personnel who own and manage the resource;
3) the DOORS servers with URLs (or IDNs) for the primary and secondary DOORS servers that publish the metadata not maintained at the PORTAL registry.

Given the operational features of both DOORS and PORTAL described respectively in Sections VII-C and VII-D, resource label registries should maintain records with the following permitted metadata for each resource:

4) the resource tags with character strings permitted by the policies of the specific PORTAL registry type;
5) the resource cross-references with any globally unique identifiers permitted by the policies of the specific PORTAL registry type for identification of the resource in other systems unrelated to PORTAL-DOORS;
6) the owner signature with the XML-Signature of the owner permitted by the generic PORTAL registry type;
7) any other metadata permitted by the policies of the specific PORTAL registry type.

Figure 2:
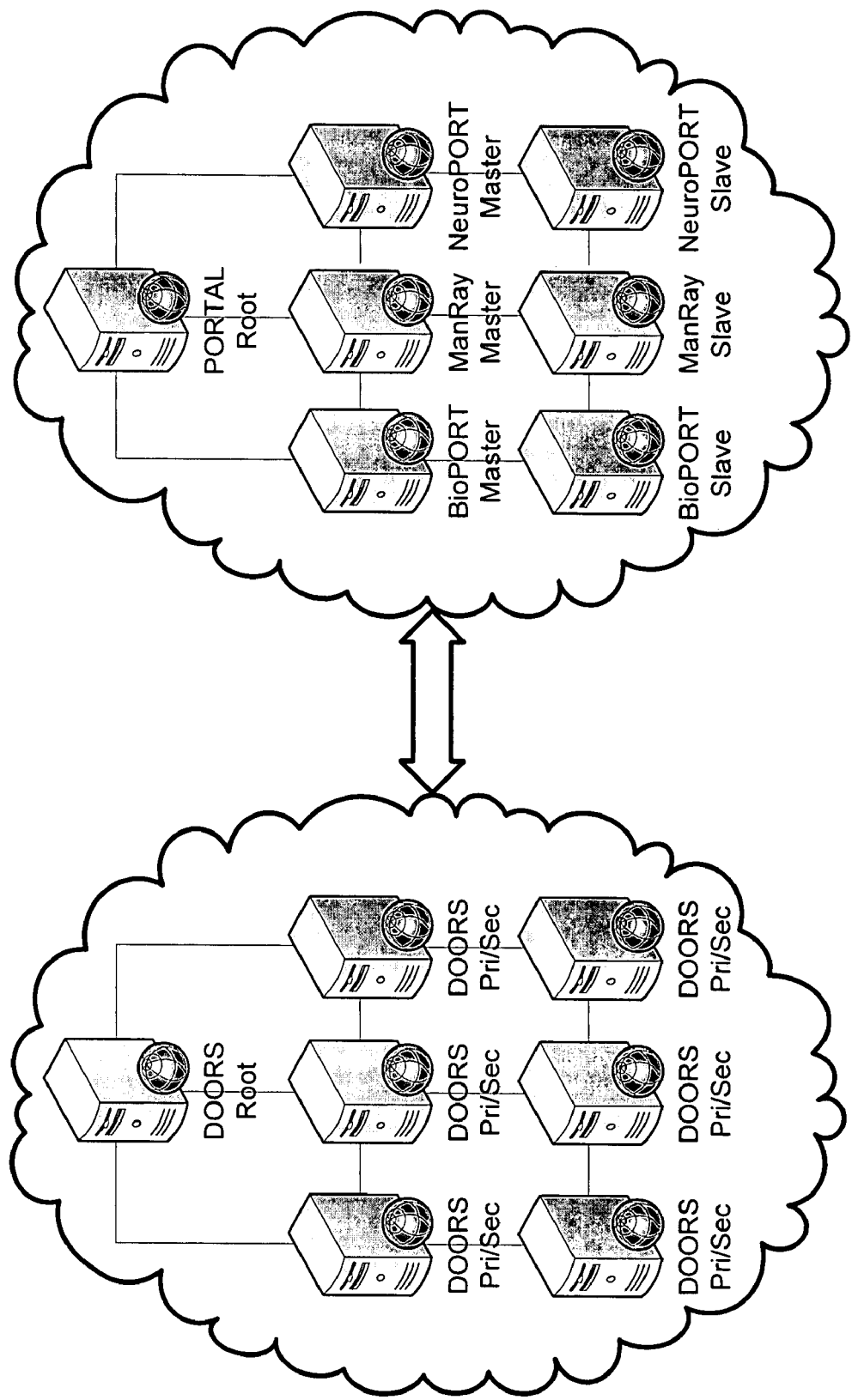
FIG. 2 is a diagram representing an exemplary PORTAL-DOORS distributed hierarchical database system with the PORTAL and DOORS networks of root, authoritative, and non-authoritative servers all interacting with each other, in accordance with one embodiment of the present invention.

Metadata items listed in Sections VII-A and VII-B are considered required or permitted with respect to the generic PORTAL registry type, not with respect to a semantic domain specific PORTAL registry type (see FIG. 2). Thus, the schema imposed by the PORTAL root server (for the generic type) is least restrictive while a schema imposed by a PORTAL master server (for a specific type) may be more restrictive. An item considered permitted with respect to the generic PORTAL registry type may be considered required with respect to a specific PORTAL registry type if declared by its policies. Distinct registry types serving different semantic domains of inquiry may have very different policies regarding the manner in which unique labels and optional tags are created for each resource when registered.

For example, a specific registry type could allow each resource to be registered with a number of optional tags consisting of a single principal tag and multiple supporting tags. Registrants could then select a number of available tokenized names and phrases for assignment to the resource being registered. In such a scenario (see Section VIII), one of the tokenized names should be noncolonized and designated as the principal tag for concatenation with a URI or IRI namespace controlled by either the resource owner or by the registry type. This approach would facilitate a policy in which both a locally unique resource tag (the principal tag) and a globally unique resource label (URI or IRI concatenated from namespace and tag) are guaranteed for each registered resource. Thus, even if the unique label for use by machines is long or complicated, multiple synonymous and simple tags are made available for use by humans who might not wish to remember or type the complex labels.

C. DOORS Server Functions

Just as DNS permits domain name owners to create and update records at name servers with the addresses for their domains, DOORS should permit resource label owners to maintain records with the locations of their resources. Just as DNS operates with a hierarchical system of forwarding and caching servers (see Section V) to map domain names to numeric addresses, DOORS should map resource labels to internet locations with the following additional features:

1) Map label to location: Perform a lookup for a resource labeled uniquely by URI (or IRI) and return the associated URLs (or IDNs) required to be resolvable internet locations for a) the primary site and any mirror sites for the resource itself (a mapping via the associated URLs from the URI label to the resource itself), b) the URI (or IRI) namespace directory containing associated metadata maintained by the resource owner with descriptions in RDDL (a more indirect mapping via the associated URLs from the URI label to the metadata at the namespace directory linking to the resource), or c) the contact information maintained by the governing PORTAL registry if neither the resource itself nor its URI namespace is maintained online by the resource owner (the most indirect mapping via the associated URL from the URI label to the metadata at the registry enabling contact with the owner of the offline resource).
2) Map tag to location: Perform a lookup for a resource labeled uniquely by tag and return the associated URI and URLs subject to the constraint restricting the lookup to those resources governed by PORTAL registries of the same specific registry type with a policy that imposes uniqueness of a principal tag (see Section VII-B).
3) Search non-semantic strings in labels or tags: Find resources by string query of character substrings in labels or tags and return the associated URIs and URLs recognizing that the search may yield non-unique results when performed across resources governed by registries of different registry types or of the same registry type without a policy imposing at least one unique tag.1
4) Search semantic statements in descriptions: Find resources by semantic query with SPARQL [72] of semantic statements in descriptions and return the associated URIs and URLs recognizing that the search may yield unranked non-unique results.
5) Provide identification and authentication: Include the provenance and signature of each resource record returned in the response to the lookup or query request.

Just as the network of DNS directories depends on a separate but related system of IRIS registries, DOORS depends on PORTAL. Both DOORS and DNS are directories, not registries. A DOORS search serves a fundamentally different purpose than a PORTAL search (see Section VII-D).

FIG. 2 is a diagram representing an exemplary PORTAL-DOORS distributed hierarchical database system with the PORTAL and DOORS networks of root, authoritative, and non-authoritative servers all interacting with each other, in accordance with one embodiment of the present invention.

Resource metadata server networks for PORTAL registering of labels and tags and DOORS publishing of locations and descriptions (see FIG. 1); analogous to domain metadata server networks for IRIS registering of names and DNS publishing of addresses. Both the PORTAL and DOORS server networks contain root, authoritative, and non-authoritative servers all of which interact with each other. Authoritative and non-authoritative servers for DOORS are called respectively primary and secondary, whereas those for PORTAL are called master and slave. The same DOORS server may operate as primary for some records while simultaneously as secondary for other records. Any problem domain specific PORTAL registry type (enforced by each of the BioPORT (see Section VIII), ManRay [73], and NeuroPORT master servers for the example registry types in the figure) must also adhere to the requirements imposed by the generic PORTAL registry type (enforced by the PORTAL root server) to maintain compliance with compatibility for cross-registry searches.

D. PORTAL Server Functions

Just as IRIS registries (See [48] for a discussion of the differences between 'thick' and 'thin' models for registrar/registry systems in which the registrar accepts registrations from registrants on behalf of the registries) publish the primary and secondary DNS servers for each registered domain name, PORTAL registries should publish the primary and secondary DOORS servers for each registered resource label with the following additional features:

1) Comply with generic root schema: Adhere to the schema required by root servers of the generic PORTAL registry type governing the interaction between servers of different specific PORTAL registry types.
2) Comply with specific master schema: Adhere to the schema required by master servers of the same specific PORTAL registry type governing the interaction between PORTAL and DOORS for the semantic domain of inquiry (i.e., the problem domain or specialty area) determined by declarations of the a) ontologies controlling semantic statements in and queries of the resource description, b) policies establishing any additional requirements or options for the resource label, tags, and locations, c) policies establishing any additional requirements or options for the record provenance, distribution, and signature for the metadata maintained collectively at PORTAL registries and DOORS servers.
3) Recommend related master PORTAL servers: Provide a list of recommended PORTAL master servers of different specific registry types to facilitate cross-registry searches in related specialty areas.
4) Recommend related primary DOORS servers: Provide a list of recommended DOORS primary servers to facilitate recursive forwarding between DOORS servers for the set of recommended PORTAL master servers.
5) Publish resource DOORS servers: Perform a lookup of a registered resource by label or tag and return the assigned primary and secondary DOORS servers for the associated metadata record.
6) Publish resource cross-references: Perform a lookup of a registered resource by label or tag and return any cross references identifying the resource in other systems unrelated to PORTAL-DOORS.
7) Publish resource owner and other metadata: Perform other standard requests of registrar/registry systems [69] such as a lookup that returns all resources registered by an owner and a lookup that returns the contact information for the resource owner, managing personnel, or any other associated metadata.

The following table summarizes server functions for both PORTAL and DOORS servers from the perspective of each server network system as well as both the resource owner and user.

|  | PORTAL | DOORS |
|---|---|---|
| System | Enforce generic root and specific master schemas | Access PORTAL generic root and specific master schemas |
|  | Recommend list of related master servers | Redistribute list of related master PORTAL servers |
|  | Recommend list of related primary DOORS servers | Redistribute list of related primary servers |
| Owner | Create and maintain owner account at master server | Create and maintain owner account at primary server |
|  | Create and maintain resource records at master server | Create and maintain resource records at primary server |
|  | Register label and tags for each resource record | Publish location and description for each resource record |
|  | Publish cross-references for each resource record | Publish provenance and distribution for each resource record |
| User | Map label to primary and secondary DOORS servers | Map label to location |
|  | Map label or tags to cross-references | Map tag to location |
|  | Map cross-reference to label and tags | Search semantic statements in descriptions |
|  | Search non-semantic strings in labels or tags | Search non-semantic strings in labels or tags |
|  | Obtain owner information and other metadata | Obtain record identification and authentication |

E. Implementation of PORTAL and DOORS

PORTAL and DOORS could each be implemented as web services over http. However, doing so requires faith in 'one-size-fits-all' mantra currently promoted by some advocates of web services. Moreover, it precludes the possibility of using and optimizing a network infrastructure communications protocol for intended and related purposes rather than all possible purposes. Consequently, it would be better to consider the existing DNS and CRISP protocols for a primary implementation of DOORS and PORTAL after which an additional web service interface could be implemented.

Thus, DOORS could be implemented as an extension of either DNS or CRISP protocols since both have mechanisms enabling extensions. However, PORTAL should be implemented as an extension of the CRISP protocol because lies so naturally within the scope of the stated goals for CRISP. Further, CRISP as an implementation framework for both PORTAL and DOORS functionalities would enable better interoperability of each with the other. Using the same framework for both functionalities would also more readily facilitate development of a server suite that could be configured for deployment on a machine as both PORTAL and DOORS together or as either PORTAL or DOORS alone. Analogously, a client suite or an integrated client could also be developed capable of querying either DOORS or PORTAL servers.

If specifications for the DOORS and PORTAL systems are implemented as extensions of the CRISP framework, then they should be derived as XML schemas that depend upon the CRISP protocols. The schema DOORS1 for DOORS should inherit from the IRIS core protocol iris1 with extensions to maintain compliance with the requirements for DOORS data records (Section VII-A) and server functions (Section VII-C) while making it more suitable for use with semantic web applications. For example, the generic bagType and bagsType used in IRIS request and response transactions [49] must be modified to define an additional rdfBagType for bags with RDF content. The schema PORTAL1 for the generic PORTAL registry type should be implemented as an 'RDFized' analogue of the schema dreg2 (for domain registry [69]) with modifications to maintain compliance with the requirements for PORTAL data records (Section VII-B) and server functions (Section VII-D). Individual schemas for specific registry types must inherit from the schema PORTAL1. Each could be named arbitrarily (e.g., ManRay) or in a manner reflecting its specialty area (e.g., BioPORT, GenePORT, NeuroPORT, CardioPORT, GeoPORT, AstroPORT).

VIII. BioPORT

Within the PORTAL system, the schema BioPORT1 for the specific registry type BioPORT is derived from the schema PORTAL1 for the generic registry type PORTAL. BioPORT focuses its semantic lens on biomedical computing as the problem domain of inquiry. The policies imposed by the BioPORT registry type are intended to be as flexible as possible to allow graceful evolution with respect to changing biomedical and computing ontologies. These flexible policies should facilitate the development of applications built upon the infrastructure services exposed by DOORS servers publishing locations and descriptions of resources with labels and tags registered at PORTAL registries of the BioPORT type.

This flexibility entails allowing the RDF triples of the resource description to reference any version of any biomedical or computing ontology when making a semantic statement about the resource. To limit the 'payload' size of resource records redistributed throughout the DOORS server network, and to limit the search space for DOORS semantic queries of resource descriptions, the number of RDF triples allowed per resource description must be constrained. It is arbitrarily set at a maximum of nine in BioPORT with a minimum of two, of which one must be a biomedical statement and the other a computing statement, that reference a simple ontology on biomedical computing integrated within BioPort. However, each of the seven other semantic statements per record can reference different external ontologies without restriction. Moreover, a resource owner can modify the set of semantic statements in the resource description at any time. Similarly, the owner can modify the resource location at any time in a manner analogous to changing the IP address numbers for a domain name record at an authoritative DNS server.

BioPORT's flexibility also entails permitting optional PORTAL cross-references and tags to be associated with the unique required PORTAL label as defined in Section VII-B. Although PORTAL requires neither cross-references nor tags, BioPORT permits cross-references, permits supporting tags, and requires a principal tag. The latter must be a non-colonized and tokenized name unique within BioPORT. Imposing this policy enables BioPORT registration of resources with a required PORTAL label that defaults to a concatenation of BioPORT's namespace with the principal tag for the resource. This default labeling scheme benefits those owners with offline resources and/or without their own supported URI or IRI namespaces. Supporting tags may be any word or phrase strings registered optionally in BioPORT as additional tags. Cross-references may be any URIs or IRIs stored optionally in BioPORT for identifying the resource in other systems. This flexibility should encourage development of applications that exploit DOORS string searches on resource labels and tags in addition to DOORS semantic searches on resource descriptions while maintaining crosslinks between resources in PORTAL-DOORS and cross-references to other systems.

As a metadata registry intended for biomedical computing resources, BioPORT will not be limited to resources implemented primarily as web services or as grid services, but will also be available for registration of resources that do not require the internet for operation, are not now implemented as web or grid services, or perhaps may never be at any time in the future. Some representative examples of such resources include Dalal's NUTMEG [74] in neuroimaging and Taswell's ELIDA [71] in biostatistics (see pseudo-record example in Section VII-A). Other examples abound for offline resources that would contribute to more productive research if registered with appropriate web-enabled semantic interlinks to the scientific literature and other resources. Finally, registration of a label, principal tag, and/or supporting tags for a resource at a BioPORT registry does not preclude registration at other registries (see FIG. 2 with BioPORT, ManRay [73], and NeuroPort registries) in a manner analogous to the registration of the same name in different *.com, *.net, and *.org generic top-level domain name registries.

IX. Resource Labels Versus Domain Names

The PORTAL-DOORS framework proposed here has been designed as part of the infrastructure for the semantic web. As an infrastructure system based on resource metadata with labels, tags, locations, and descriptions, it facilitates most readily the development of semantic search applications. However, it can also serve as part of the foundation for developing other kinds of semantic web applications. Just as distributed cached copies of DNS records with domain names and addresses helped to spur the growth of the original web, so too will distributed cached copies of DOORS records with resource labels and locations help further the growth of the semantic web. Just as people were motivated to register and assume responsibility and ownership of domain names, so too will people be motivated to register and assume responsibility for resource labels, especially if appropriate resource-label driven browsers for the semantic web are developed analogous to the domain-name driven browsers for the original web.

Resource labels are different from domain names in many ways not least of which remains the greater universality of resource labels with their associated tags and descriptions. As defined here, resource labels are much more general and flexible than domain names. A resource may be any entity whether abstract or concrete, whether offline or online. Its label may be any URI or IRI. Its non-semantic tag may be any tokenized name or phrase including anything from multi-word phrases to restricted noncolonized names capable of serving as an unqualified XML name for an XML tag. Its semantic description may be any set of RDF triples referencing ontologies. As a compelling example of a registry type fully exploiting the capabilities of the resource label system proposed here, a patent and trademark office could develop a registry type with policies that accommodate the registration of resources which may be products, services, and patented devices or methods. These resources may be assigned unique labels with associated tags consisting of one or more trade or service marks, and with associated descriptions referencing ontologies for patent and trademark classes and the semantic definitions for entities within those classes.

Moreover, just as domain names have served many different internet communication protocols from telnet to http, so too can resource labels serve many different currently evolving communication systems whether web services or distributed grid. If implemented, supported, and maintained as a separate independent infrastructure, the PORTAL-DOORS framework can be tuned and optimized for metadata while the distributed grid and web services will perhaps continue to be optimized, respectively, for scientific and business purposes, each with different kinds of messaging requirements for the different kinds of data (i.e., not just metadata) exchanged.

An infrastructure optimized for resource metadata and semantic searches with messages of small size limited by design should not necessarily be the same as one optimized for messages of unlimited and potentially large size whether tuned for grid computing with binary data or for secure commerce with text data. By integrating into a common infrastructure framework the capability for both string search on the resource labels and semantic search on the resource descriptions, the DOORS and PORTAL systems enable a graceful transition from the original web to the semantic web as the ontologies for the semantic web continue to evolve.

X. Synergistic Systems

As discussed in Sections II and III, the semantic web has not yet achieved the goals set by its visionaries. Good and Wilkinson [75] assert that "most, if not all, of the standards and technologies" have been established and suggest that the barriers to progress remain "social rather than technological." The opinion advanced here in this paper remains contrary, i.e., not enough of the necessary infrastructure has yet been designed and built. As reviewed by many authors (including [25], [26], [31], [32]), semantic web systems currently in place do not suffice. They remain far too complicated to motivate most users, and even many developers, to become involved and participate in building the semantic web.

Other authors have also called for development of additional necessary technologies, systems, and applications. Quan et al. [29], [76], Dzbor et al. [77], and Alani et al. [78] have all argued for a semantic web browser or a 'killer app' as the necessary key to unlock the doors to the semantic web. Despite choosing the suggestive acronyms DOORS and PORTAL for the infrastructure systems proposed here, they do not suffice alone any more than would the best conceived 'killer app' or the most zealous social will.

The original web succeeded as a consequence of the amazing synergism between DNS as a domain name system with registries and name servers, http as a communications protocol, and web browsers to view web pages published by people motivated to register domain names for their web sites. The semantic web will succeed analogously when a similar dynamic synergism can be created between a resource label system with registries and label servers, all of the appropriately optimized communications protocols, and the necessary semantic web browsers and label search clients to access resources published by people motivated to register labels and maintain descriptions for their resources.

Until then, searches on the web (whether at google.com, yahoo.com, or even a specialty search engine when a particular database record locator is not input) will continue to yield irrelevant or innumerable results too often. These results then lose practical usefulness because they consume too much time for the user who attempts to peruse them. New versions of search engines such as Swoogle [79] and OntoLook [80] will hopefully enable useful search of the semantic web in the future. But the current semantic web itself requires sufficient growth and development with enough metadata annotation of enough resources and documents before a threshold of practical use can be attained.

XI. Semantic Search and Analysis Applications

Kazic [81] agrees with the "genuine need for fast, accurate delivery of relevant information in ways that do not overwhelm humans" in her insightful and enlightening analysis on factors influencing the adoption of the semantic web. Regarding this point, she emphasizes "accuracy, relevance, and comprehensibility". But in discussing technology adoption, Kazic omits mention of the original authoritative work of Rogers [82] and other key investigators including Fichman [83] who have contributed to the empirical field that studies technology innovation, diffusion, and assimilation.

Thus, Kazic's own search of the literature performed as part of her analysis [81] does not meet the declared criterion of "comprehensibility". A more comprehensive search would have benefited from the semantic association networks (SANs) discussed by Börner [84] for improving scholarly knowledge and expertise management. SANs integrated with digital libraries would enable investigators to cross disciplines and search fields outside of their main area of expertise without being required to know in advance key words such as the phrase "diffusion of innovations" that would have been relevant to Kazic's search of the literature.

From the perspective of biomedical computing in health care and life sciences, the topic of technology innovation, diffusion, and assimilation provides an interesting test case for continuing development of semantic search and SANs. Can theoretical and computational models with results from experimental research for technology and knowledge diffusion [82], [83], [85], [86] be related to work on predator-prey interactions [87], the spread of epidemics [88], and speciation in phylogenetics [89] such that these scholarly fields are interlinked within SANs? Will the creation of SANs in this manner contribute to cross fertilization that yields more productive research in each of the fields participating?

Productive cross fertilization with improved communication between basic and clinical science remains the primary goal of translational research and drug discovery [90]. As an important use case for semantic web technologies (with infrastructure components and services for machines) and semantic search, decision support, and knowledge management applications (with user interface tools for humans), informatics for translational medicine on the semantic web and grid will be driven by the compelling needs and powerful finances of the health care and pharmaceutical industries. Continuing development of the infrastructure, tools, and applications will be guided by benchmarks and measures for ontology evaluation [91]-[94], knowledge ranking [95], system performance

[96], and surely other new metrics yet to be invented, as well as by the legal and social issues pertaining to semantic web standards [97].

XII. A Hybrid, Bootstrap, and Bridge

To gain traction, PORTAL-DOORS should initially focus on development as an infrastructure for search applications with the tangible benefit of saving people time, and on application contexts where many people would be motivated to promote and publicize their resources, e.g., named entities including information databases and computing applications in scholarly research, or trademarks and named products and services in commercial business. If so, then the PORTAL-DOORS infrastructure proposed here could serve as a bootstrap to help further jumpstart the semantic web and the development of more sophisticated systems (e.g., agent-driven composition of services [98]) that require search as just one piece of the puzzle. As a bootstrap, the PORTAL-DOORS framework eschews debates about formal ontologies versus informal folksonomies and microformats [99]-[101]. Instead, it creates a hybrid with labels (URIs and IRIs) and tags (key word and phrase strings) for the original web, and with descriptions (RDF triples) for the semantic web, that also serves as an effective bridge between the original web and the semantic web.

Concomitant development of resource label and tag editors for PORTAL registry records, resource location and description editors for DOORS server records, and semantic search clients or plugin modules for web browsers should be guided by designs intended to help motivate resource owners by simplifying for them the task of label registration and description maintenance for their resources. Resource descriptions will evolve over time as owners replace semantic statements referencing older ontologies with statements referencing newer ontologies. The collective wisdom of large numbers of people will thus determine the popularity of ontologies and the usage patterns of the RDF triples for the semantic statements contained within the resource descriptions. Analysis of these usage patterns and their reflection of human thought and behavior will enable the development of improved ontologies. This kind of investigation will constitute another manifestation of the new science of the web [3].

Web science itself must be pursued with full cognizance of antedisciplinary versus interdisciplinary science and multidisciplinary teams versus individuals [102], [103]. In particular, Eddy [102] emphasizes that "Progress is driven by new scientific questions, which demand new ways of thinking. You want to go where a question takes you, not where your training left you." As web science matures, and ontologies improve, the PORTAL-DOORS framework can be enhanced and refined. If it is fully implemented and adopted as part of the infrastructure foundation for the semantic web sufficiently popularized by both developers and users, then PORTAL and DOORS will contribute to building the pervasive web of knowledge envisioned by the founders of the semantic web.

XIII. Conclusion

PORTAL and DOORS are proposed as systems respectively for registering resource labels and tags and publishing resource locations and descriptions. They are thus analogous to IRIS and DNS respectively for registering domain names and publishing domain addresses. PORTAL and DOORS are designed to serve the semantic web just as IRIS and DNS are designed to serve the original web (see Table I). The PORTAL-DOORS paradigm favors a flexible and modular approach promoting collaborative networks of crosslinking resources and interreferencing ontologies capable of evolving dynamically with any changing standards for RDF and OWL that add future extensions for ordered relationships, probabilistic reasoning, or other refinements.

In contrast with existing directories such as OBRC [23] that endeavor to become a "one-stop gateway" to resources, the PORTAL-DOORS paradigm seeks to build a decentralized and distributed infrastructure that supports mass collaboration tapping the power of wikinomics [104] and enabling "all webizens to create, share, distribute, and enjoy ideas and information" [105]. In contrast with existing non-semantic systems such as PURL and Handle (see Section VI), the PORTALDOORS framework is built upon the XML/RDF/OWL foundations of the semantic web. In contrast with existing semantic systems such as SAN [84] or SemBOWSER [106], the PORTAL-DOORS framework does not limit registration of resources to those of only a particular format or technology such as literature documents [84] or web services [106].

Resources for which unique labels with optional tags are registered in PORTAL are not required to be semantic resources in and of themselves. Rather, it is only their descriptions published in DOORS that contain semantic metadata referencing ontologies. The resources themselves may be anything whether abstract or concrete, offline or online. Pending development of user interfaces with label, tag, location, and description editors, resource owners should be able to maintain their own data records at PORTAL and DOORS servers without the intervention of expert curators or administrators.

In analogy with the IRIS-DNS framework and its multiplicity of registries for top-level domains such as *.com, *.net, and *.org, the PORTAL-DOORS framework enables a multiplicity of registries for different problem oriented domains such as BioPORT (see Sections IV and VIII), Man-Ray [73], and NeuroPORT (see FIG. 2). Cross-registry searches will be facilitated by the common shared semantic foundation throughout the PORTAL-DOORS server networks.

Open source projects for BioPORT, PORTAL, and DOORS will be hosted at www.biomedicalcomputing.org and at www.portaldoors.org. Working drafts of BioPORT1, PORTAL1, and DOORS1 schemas will serve as the formal specifications for BioPORT as a prototype metadata registry within a system of PORTAL registries for resource labels and tags and DOORS servers for resource locations and descriptions. Initial root servers for PORTAL and DOORS will be maintained respectively at portal.portaldoors.org and at doors.portaldoors.org.

XIV. Advertising

The following section describes some of the advertising ramifications and usages resulting from the present invention:

A first scenario using PORTAL-DOORS for advertising displays advertisements adjacent to and/or in association with relevant PORTAL-DOORS search results for:

1-A) Non-semantic string queries on PORTAL-DOORS resource labels

1-B) Non-semantic string queries on PORTAL-DOORS resource tags

1-C) Semantic queries on PORTAL-DOORS resource descriptions

1-D) Combination queries that search labels, tags, and/or descriptions

In this scenario, the customer, typically a business selling their product or service, purchases the right to advertise their product or service in association with all searches for a particular label, tag, description, and/or semantic concept related to semantic concepts within the description that was searched. Note that these searches are done by people who use the PORTAL-DOORS search engine. Upon viewing the search results, they will also view the associated advertisements with links to the business selling a product or service.

A second scenario of using PORTAL-DOORS for advertising displays advertisements relevant to registered resources based on PORTAL-DOORS analysis of the relevant resources' labels, tags, and/or descriptions.

In this scenario, there are two sets of customers: the content publishers (or service provider) and the advertisers. The content publisher (or service provider) accepts placement of advertisements on their web site where the content is published (or service is provided). The content publisher (or service provider) receives payment for click-throughs from the advertisers who are connected with the content publisher (or service provider) via PORTAL-DOORS as intermediary. PORTAL-DOORS provides appropriate matching of advertisers with most relevant and appropriate content publishers and service providers. Note that in this scenario, there is typically no obvious use by an end-user of the PORTAL-DOORS search engine. Rather, PORTAL-DOORS runs behind the scenes to match service providers with advertisers.

Preferably, all of the advertising components should be separate from the underlying PORTAL-DOORS infrastructure. The PORTAL-DOORS infrastructure should preferably become an open standard. Thus, the advertising components should preferably be developed and maintained as independent proprietary components layered ON TOP of the underlying PORTAL-DOORS infrastructure.

XV. Miscellaneous

Figure 3:
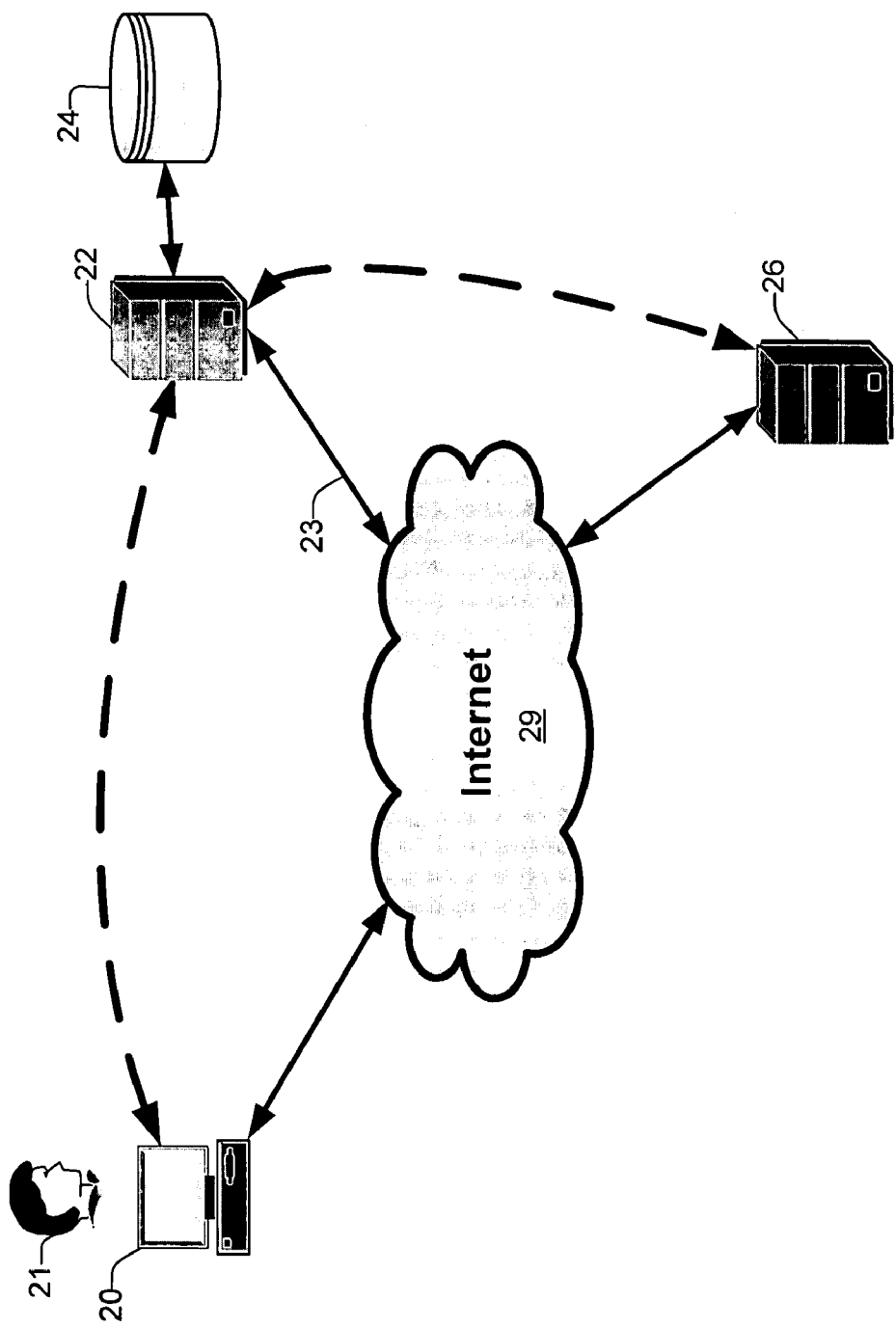
FIG. 3 is a block diagram illustrating an exemplary physical and logical view of the operation of the present invention.

FIG. 3 is a block diagram illustrating an exemplary physical and logical view of the operation of the present invention. A user 21 sitting at a computer 20 makes a semantic request, which is transmitted across the Internet 29 to a server 22 operating as a Problem Oriented Registry of Tags And Labels (PORTAL) system operating as a resource label and tag registering system (i.e., IRIS extension) and a Domain Ontology Oriented Resource System (DOORS) operating as a resource location and description publishing system (i.e., DNS analogue). The server 22 contains or is coupled to disks 24 or other static memory devices that contain a DOORS database. The records returned to the user's system 20 is used to access the server or servers 26 that provide the required information across the Internet 29 to the user 21.

Figure 4:
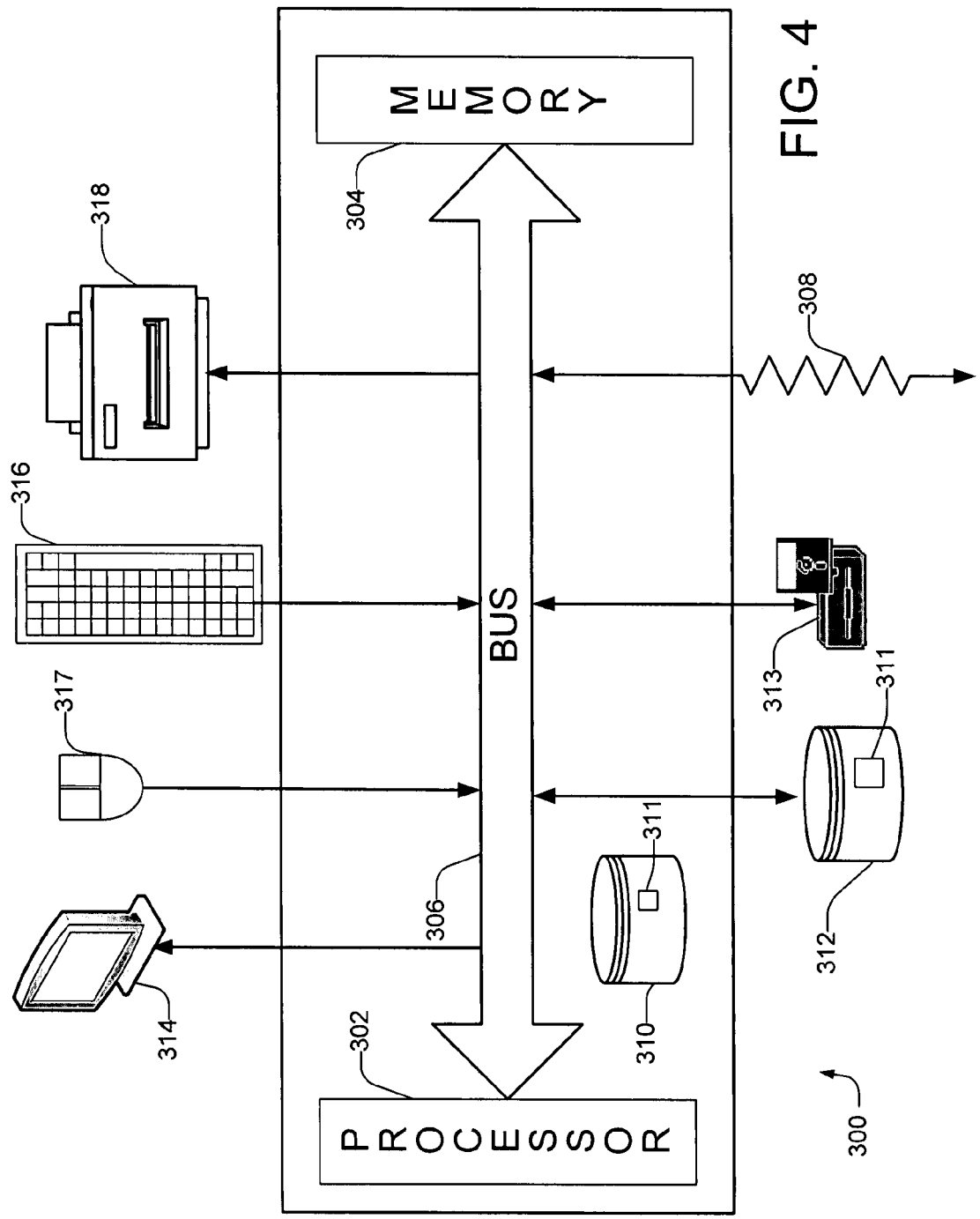
FIG. 4 is a block diagram illustrating a General Purpose Computer.

FIG. 4 is a block diagram illustrating a General Purpose Computer 300. The General Purpose Computer 300 has a Computer Processor 302, and Memory 304, connected by a Bus 306. Memory 304 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 310, External Storage 312, output devices such as a monitor 314, input devices such as a keyboard 316 and mouse 317, and printers 318. Secondary Storage 310 includes machine-readable media such as hard disk drives, magnetic drum, and bubble memory. External Storage 312 includes machine-readable media such as floppy disks 313, removable hard drives, magnetic tape, CD-ROM, and even other computers, possibly connected via a communications line 308. The distinction drawn here between Secondary Storage 310 and External Storage 312 is primarily for convenience in describing the invention. As such, it should be appreciated that there is substantial functional overlap between these elements. Computer software such operating systems, finance, budgeting, and user programs as well as user data can be stored in a Computer Software Storage Medium, such as memory 304, Secondary Storage 310, and External Storage 312. Executable versions of computer software 311, such as browser, operating system, semantic web, and routing software can be read from a Non-Volatile Storage Medium such as External Storage 312, Secondary Storage 310, and Non-Volatile Memory and loaded for execution directly into Volatile Memory, executed directly out of Non-Volatile Memory, or stored on the Secondary Storage 310 prior to loading into Volatile Memory for execution.

Those skilled in the art will recognize that modifications and variations can be made without departing from the spirit of the invention. Therefore, it is intended that this invention encompass all such variations and modifications as fall within the scope of the appended claims.

XVI. References

The following table contains the references cited above. References are included separately here for readability purposes, and as such, should not be taken as an admission of their relevancy or importance. A reference number is indicated by "[x]", with "x" being a positive integer, with the reference below corresponding to the reference numbers above.

| No. | Description |
|---|---|
| [1] | I. Jacobs, "About the world wide web consortium (W3C)." [Online]. Available: http://www.w3.org/Consortium/about-w3c |
| [2] | T. Berners-Lee, J. Hendler, and O. Lassila, "The semantic web," Sci Am, vol. 284, no. 5, pp. 34-43, May 2001. |
| [3] | T. Berners-Lee, W. Hall, J. Hendler, N. Shadbolt, and D. J. Weitzner, "Computer science. creating a science of the web." Science, vol. 313, no. 5788, pp. 769-771, August 2006. |
| [4] | "Extensible markup language (XML)," W3C Recommendation, August 2006. [Online]. Available: http://www.w3.org/XML/ |
| [5] | "Resource description framework (RDF)," W3C Recommendation, February 2004. [Online]. Available: http://www.w3.org/RDF/ |
| [6] | J. Z. Pan, "A flexible ontology reasoning architecture for the semantic web," IEEE Trans Knowl Data Eng, vol. 19, no. 2, pp. 246-260, February 2007. |
| [7] | "Web ontology language (OWL)," W3C Recommendation, February 2004. [Online]. Available: http://www.w3.org/2004/OWL/ |

-continued

| No. | Description |
|---|---|
| [8] | T. Berners-Lee, D. Fensel, J. A. Hendler, and H. Lieberman, Spinning the Semantic Web: Bringing the World Wide Web to Its Full Potential. MIT Press, 2005. |
| [9] | L. W. Lacy, OWL: Representing Information Using the Web Ontology Language. Trafford Publishing, 2005. |
| [10] | V. Geroimenko and C. Chen, Eds., Visualizing the Semantic Web: XMLBased Internet and Information Visualization, 2nd ed. Springer, 2006. |
| [11] | J. Davies, R. Studer, and P. Warren, Eds., Semantic Web Technologies: Trends and Research in Ontology-Based Systems. John Wiley & Sons, 2006. |
| [12] | C. J. O. Baker and K.-H. Cheung, Eds., Semantic Web: Revolutionizing Knowledge Discovery in the Life Sciences. Springer, 2007. |
| [13] | L. Baresi, E. D. Nitto, and C. Ghezzi, "Toward open-world software: Issues and challenges," IEEE Computer, vol. 39, no. 10, pp. 36-43, October 2006. |
| [14] | H. Zhuge, "Future interconnection environment," Computer, vol. 38, no. 4, pp. 27-33, April 2005. |
| [15] | ___, "Semantic grid: scientific issues, infrastructure, and methodology," Commun ACM, vol. 48, no. 4, pp. 117-119, 2005. |
| [16] | M. A. Harris et al., "The Gene Ontology (GO) project in 2006," Nucleic Acids Res, vol. 34, no. Database issue, pp. D322-D326, 2006. |
| [17] | O. Bodenreider and R. Stevens, "Bio-ontologies: current trends and future directions." Brief Bioinform, vol. 7, no. 3, pp. 256-274, September 2006. |
| [18] | F. Pinciroli and D. M. Pisanelli, "The unexpected high practical value of medical ontologies." Comput Biol Med, vol. 36, no. 7-8, pp. 669-673, 2006. |
| [19] | C. Brooksbank, G. Cameron, and J. Thornton, "The European Bioinformatics Institute's data resources: towards systems biology." Nucleic Acids Res, vol. 33, no. Database issue, pp. D46-D53, January 2005. |
| [20] | D. L. Wheeler et al., "Database resources of the National Center for Biotechnology Information," Nucleic Acids Res, vol. 33, no. Database issue, pp. D39-D45, January 2005. |
| [21] | M. Y. Galperin, "The molecular biology database collection: 2007 update." Nucleic Acids Res, vol. 35, no. Database issue, pp. D3-D4, January 2007. [Online]. Available: http://dx.doi.org/10.1093/nar/gkl1008 |
| [22] | J. A. Fox, S. McMillan, and B. F. F. Ouellette, "A compilation of molecular biology web servers: 2006 update on the bioinformatics links directory." Nucleic Acids Res, vol. 34, no. Web server issue, pp. W3-W5, July 2006. |
| [23] | Y.-B. Chen, A. Chattopadhyay, P. Bergen, C. Gadd, and N. Tannery, "The Online Bioinformatics Resources Collection at the University of Pittsburgh Health Sciences Library System: a one-stop gateway to online bioinformatics databases and software tools." Nucleic Acids Res, vol. 35, no. Database issue, pp. D780-D785, January 2007. |
| [24] | S. Philippi and J. Köhler, "Using XML technology for the ontologybased semantic integration of life science databases." IEEE Trans Inf Technol Biomed, vol. 8, no. 2, pp. 154-160, June 2004. |
| [25] | ___, "Addressing the problems with life-science databases for traditional uses and systems biology." Nat Rev Genet, vol. 7, no. 6, pp. 482-488, June 2006. |
| [26] | E. Neumann, "A life science semantic web: are we there yet?" Sci STKE, vol. 2005, no. 283, p.pe22, May 2005. |
| [27] | E. K. Neumann and D. Quan, "Biodash: a semantic web dashboard for drug development." Pac Symp Biocomput, pp. 176-187, 2006. |
| [28] | T. Clark, S. Martin, and T. Liefeld, "Globally distributed object identification for biological knowledgebases." Brief Bioinform, vol. 5, no. 1, pp. 59-70, March 2004. |
| [29] | D. Quan and D. R. Karger, "How to make a semantic web browser," in Proceedings of the 13th International Conference on World Wide Web. New York: Association for Computing Machinery Press, 2004, pp. 255-265. |
| [30] | "W3C semantic web health care and life sciences interest group." [Online]. Available: http://www.w3.org/2001/sw/hcls/ |
| [31] | N. Cannata, E. Merelli, and R. B. Altman, "Time to organize the bioinformatics resourceome." PLoS Comput Biol, vol. 1, no. 7, p. e76, December 2005. |
| [32] | K. H. Buetow, "Cyberinfrastructure: empowering a 'third way' in biomedical research." Science, vol. 308, no. 5723, pp. 821-824, May 2005. |
| [33] | C. Wroe, C. Goble, M. Greenwood, P. Lord, S. Miles, J. Papay, T. Payne, and L. Moreau, "Automating experiments using semantic data in a bioinformatics grid," IEEE Intell Syst, vol. 19, no. 1, pp. 48-55, Jan-Feb 2004. |
| [34] | V. Astakhov, A. Gupta, S. Santini, and J. S. Grethe, "Data integration in the Biomedical Informatics Research Network (BIRN)," in Data Integration in the Life Sciences - DILS 2005, ser. Lecture Notes in Computer Science, vol. 3615, 2005, pp. 317-320. |
| [35] | J. Phillips, R. Chilukuri, G. Fragoso, D. Warzel, and P. A. Covitz, "The caCORE software development kit: streamlining construction of interoperable biomedical information services," BMC Med Inform Decis Mak, vol. 6, pp. 2-, 2006. [Online]. Available: http://www.ncbi.nlm.nih.gov/entrez/query.fcgi?cmd=Retrieve&db=PubMed&do%pt=Citation&listuids=16398930 |
| [36] | D. De Roure and J. Hendler, "E-science: the grid and the semantic web," IEEE Intell Syst, vol. 19, no. 1, pp. 65-71, Jan-Feb 2004. |
| [37] | D. De Roure, N. Jennings, and N. Shadbolt, "The semantic grid: past, present, and future," Proceedings of the IEEE, vol. 93, no. 3, pp. 669-681, March 2005. |
| [38] | J. M. Benyus, Biomimicry: Innovation Inspired by Nature. William Morrow, 1997. |
| [39] | P. V. Mockapetris, "STD13 RFC1035: Domain names - implementation and specification," IETF Full Standard, November 1987. [Online]. Available: http://www.ietf.org/rfc/rfc1035.txt |
| [40] | C. Liu and P. Albitz, DNS and BIND, 5th ed. Sebastopol, CA: O'Reilly Media, 2006. |
| [41] | G. Lawton, "Stronger domain name system thwarts root-server attacks," IEEE Computer, vol. 40, no. 5, pp. 14-17, May 2007. |

-continued

| No. | Description |
|---|---|
| [42] | D. Eastlake, "RFC2535: Domain name system security extensions," IETF RFC 2535 Working Draft, March 1999. [Online]. Available: http://www.ietf.org/rfc/rfc2535.txt |
| [43] | O. Kolkman and R. Gieben, "RFC4641: DNSSEC operational practices," IETF RFC 4641 Working Draft, September 2006. [Online]. Available: http://www.ietf.org/rfc/rfc4641.txt |
| [44] | P. Faltstrom, P. Hoffman, and A. Costello, "RFC3490: Internationalizing domain names in applications (IDNA)," IETF RFC 3490 Working Draft, March 2003. [Online]. Available: http://www.ietf.org/rfc/rfc3490.txt |
| [45] | ICANN, "Guidelines for the implementation of internationalized domain names (version 1.0)," June 2003, Internet Corporation for Assigned Names and Numbers. [Online]. Available: http://www.icann.org/general/idn-guidelines-20jun03.htm |
| [46] | A. Newton, "Replacing the whois protocol: IRIS and the IETF's CRISP Working Group," IEEE Internet Comput, vol. 10, no. 4, pp. 79-84, Jul-Aug 2006. |
| [47] | "Cross registry information service protocol (CRISP)," IETF Working Group Charter, last modified 2006-08-16. [Online]. Available: http://www.ietf.org/html.charters/crisp-charter.html |
| [48] | A. Newton, "RFC3707: Cross registry internet service protocol (CRISP) requirements," IETF RFC 3707 Working Draft, February 2004. [Online]. Available: http://www.ietf.org/rfc/rfc3707.txt |
| [49] | A. Newton and M. Sanz, "RFC3981: IRIS: The internet registry information service (IRIS) core protocol," IETF RFC 3981 Working Draft, January 2005. [Online]. Available: http://www.ietf.org/rfc/rfc3981.txt |
| [50] | ___, "RFC3982: IRIS: A domain registry (dreg) type for the internet registry information service," IETF RFC 3982 Working Draft, January 2005. [Online]. Available: http://www.ietf.org/rfc/rfc3982.txt |
| [51] | E. Gunduz, A. Newton, and S. Kerr, "RFC4698: IRIS: An address registry (areg) type for the internet registry information service," IETF RFC 4698 Working Draft, October 2006. [Online]. Available: http://www.ietf.org/rfc/rfc4698.txt |
| [52] | A. Newton, "XML pipelining with chunks for the information registry information service," IETF Working Draft, January 2007. [Online]. Available: http://tools.ietf.org/html/draft-ietf-crisp-iris-xpc-05/ |
| [53] | A. Newton and M. Sanz, "RFC3983: Using the internet registry information service (IRIS) over the blocks extensible exchange protocol (BEEP)," IETF RFC 3983 Working Draft, January 2005. [Online]. Available: http://www.ietf.org/rfc/rfc3983.txt |
| [54] | "Computer retrieval of information on scientific projects (CRISP)," NIH database. [Online]. Available: http://crisp.cit.nih.gov/ |
| [55] | U. Radetzki, U. Leser, S. C. Schulze-Rauschenbach, J. Zimmermann, J. Lussem, T. Bode, and A. B. Cremers, "Adapters, shims, and glue-service interoperability for in silico experiments," Bioinformatics, vol. 22, no. 9, pp. 1137-1143, 2006. |
| [56] | R. M. Bruskiewich, A. B. Cosico, W. Eusebio, A. M. Portugal, L. M. Ramos, M. T. Reyes, M. A. B. Sallan, V. J. M. Ulat, X. Wang, K. L. McNally, R. S. Hamilton, and C. G. McLaren, "Linking genotype to phenotype: the international rice information system (IRIS)," Bioinformatics, vol. 19 Suppl 1, pp. i63-i65, 2003. |
| [57] | T. Berners-Lee, R. Fielding, and L. Masinter, "STD66 RFC3986: Uniform resource identifier (URI) generic syntax," IETF Full Standard RFC, January 2005. [Online]. Available: http://www.ietf.org/rfc/rfc3986.txt |
| [58] | M. Duerst and M. Suignard, "RFC3987: Internationalized resource identifiers (IRIs)," IETF RFC 3987 Working Draft, January 2005. [Online]. Available: http://www.ietf.org/rfc/rfc3987.txt |
| [59] | "URIs, URLs, and URNs: Clarifications and recommendations 1.0," W3C Note, September 2001, accessed version 20010921. [Online]. Available: http://www.w3.org/TR/uri-clarification/ |
| [60] | J. Borden and T. Bray, "Resource directory description language (RDDL)," February 2002. [Online]. Available: http://www.rddl.org/ |
| [61] | "XHTML 1.0 the extensible hypertext markup language (second edition)," W3C Recommendation, August 2002. [Online]. Available: http://www.w3.org/TR/xhtml1/ |
| [62] | "XML linking language (XLink) version 1.0," W3C Recommendation, June 2001. [Online]. Available: http://www.w3.org/TR/xlink/ |
| [63] | "Harvesting RDF statements from XLinks," W3C Note, September 2000, accessed version 20000929. [Online]. Available: http://www.w3.org/TR/xlink2rdf/ |
| [64] | "XML topic maps (XTM) 1.0," August 2001. [Online]. Available: http://www.topicmaps.org/xtm/1.0/ |
| [65] | K. Shafer, S. Weibel, E. Jul, and J. Fausey, "Introduction to persistent uniform resource locators," March 1996. [Online]. Available: http://purl.oclc.org/docs/inet96.html |
| [66] | R. Kahn and R. Wilensky, "A framework for distributed digital object services," Int J Digital Libraries, vol. 6, no. 2, pp. 115-123, 2006. |
| [67] | S. Sun, L. Lannom, and B. Boesch, "RFC3650: Handle system overview," IETF RFC 3650 Working Draft, November 2003. [Online]. Available: http://www.ietf.org/rfc/rfc3650.txt |
| [68] | J. Z. Pan and I. Horrocks, "RDFS(FA): Connecting RDF(S) and OWL DL," IEEE Trans Knowl Data Eng, vol. 19, no. 2, pp. 192-206, February 2007. |
| [69] | A. Newton and F. Neves, "Domain registry version 2 for the internet registry information service," IETF Working Draft, May 2006. [Online]. Available: http://tools.ietf.org/wg/crisp/draft-ietf-crisp-iris-dreg2/ |
| [70] | D. Eastlake, J. Reagle, and D. Solo, "RFC3275: Extensible markup language XML-Signature syntax and processing," IETF RFC 3275 Working Draft, March 2002. [Online]. Available: http://www.ietf.org/rfc/rfc3275.txt |
| [71] | C. Taswell, "Limiting dilution assays for the determination of immunocompetent cell frequencies. I. Data analysis." J Immunol, vol. 126, no. 4, pp. 1614-1619, April 1981. |
| [72] | "SPARQL query language for RDF," W3C Working Draft, October 2006. [Online]. Available: http://www.w3.org/TR/rdf-sparql-query/ |
| [73] | C. Taswell, B. Franc, and R. Hawkins, "The ManRay project: Initial development of a web-enabled ontology for nuclear medicine," in Proceedings of the 53rd Annual Meeting of the Society of Nuclear Medicine, San Diego, CA, June 2006, p. 1431. |
| [74] | S. S. Dalal, J. M. Zumer, V. Agrawal, K. E. Hild, K. Sekihara, and S. S. Nagarajan, "Nutmeg: a neuromagnetic source reconstruction toolbox." Neurol Clin Neurophysiol, vol. 2004, p. 52, 2004. |

| No. | Description |
|---|---|
| [75] | B. M. Good and M. D. Wilkinson, "The life sciences semantic web is full of creeps!" Brief Bioinform, vol. 7, no. 3, pp. 275-286, September 2006. |
| [76] | D. Quan, D. Huynh, and D. R. Karger, "Haystack: A platform for authoring end user semantic web applications," in The Semantic Web - ISWC 2003, ser. Lecture Notes in Computer Science, vol. 2870, 2003, pp. 738-753. |
| [77] | M. Dzbor, J. Domingue, and E. Motta, "Magpie - towards a semantic web browser," in The Semantic Web - ISWC 2003, ser. Lecture Notes in Computer Science, vol. 2870, 2003, pp. 690-705. |
| [78] | H. Alani, Y. Kalfoglou, K. O'Hara, and N. Shadbolt, "Towards a killer app for the semantic web," in The Semantic Web - ISWC 2005, ser. Lecture Notes in Computer Science, vol. 3729, 2005, pp. 829-843. |
| [79] | L. Ding, T. Finin, A. Joshi, R. Pan, R. S. Cost, Y. Peng, P. Reddivari, V. Doshi, and J. Sachs, "Swoogle: a search and metadata engine for the semantic web," in CIKM '04: Proceedings of the thirteenth ACM international conference on Information and knowledge management. New York, NY, USA: ACM Press, 2004, pp. 652-659. |
| [80] | Y. Li, Y. Wang, and X. Huang, "A relation-based search engine in semantic web," IEEE Trans Knowl Data Eng, vol. 19, no. 2, pp. 273-282, February 2007. |
| [81] | T. Kazic, "Factors influencing the adoption of the semantic web in the life sciences," in Semantic Web: Revolutionizing Knowledge Discovery in the Life Sciences, C. J. O. Baker and K.-H. Cheung, Eds. Springer, 2007, ch. 17, pp. 399-412. |
| [82] | E. M. Rogers, Diffusion of Innovations, 5th ed. Free Press, 2003. |
| [83] | R. G. Fichman, "The diffusion and assimilation of information technology innovations," in Framing the Domains of IT Management: Projecting the Future . . . Through the Past, R. W. Zmud, Ed. Cincinnati OH: Pinnaflex Educational Resources, 2000, pp. 105-127. |
| [84] | K. Börner, "Semantic association networks: Using semantic web technology to improve scholarly knowledge and expertise management," in Visualizing the Semantic Web: XML-Based Internet and Information Visualization, 2nd ed., V. Geroimenko and C. Chen, Eds. Springer, 2006, ch. 11, pp. 183-198. |
| [85] | H. Zhuge, "Discovery of knowledge flow in science," Commun ACM, vol. 49, no. 5, pp. 101-107, 2006. |
| [86] | ___, "Exploring an epidemic in an e-science environment," Commun ACM, vol. 48, no. 9, pp. 109-114, 2005. |
| [87] | A. A. Berryman, "The origins and evolution of predator-prey theory," Ecology, vol. 73, no. 5, pp. 1530-1535, 1992. |
| [88] | D. J. Daley and J. Gani, Epidemic Modelling: An Introduction. Cambridge University Press, 1999. |
| [89] | J. Sullivan and P. Joyce, "Model selection in phylogenetics," Annu Rev Ecol Evol Syst, vol. 36, pp. 445-466, 2005. |
| [90] | V. Kashyap and T. Hongsermeier, "Can semantic web technologies enable translational medicine?" in Semantic Web: Revolutionizing Knowledge Discovery in the Life Sciences, C. J. O. Baker and K.-H. Cheung, Eds. Springer, 2007, ch. 12, pp. 249-279. |
| [91] | C. Patel, K. Supekar, Y. Lee, and E. K. Park, "Ontokhoj: a semantic web portal for ontology searching, ranking and classification," in WIDM '03: Proceedings of the 5th ACM international workshop on Web information and data management. ACM Press, 2003, pp. 58-61. |
| [92] | J. Brank, M. Grobelnik, and D. Mladenic, "A survey of ontology evaluation techniques," in SIKDD 2005, Ljubljana, Slovenia, October 2005. |
| [93] | M. Sabou, V. Lopez, E. Motta, and V. Uren, "Ontology selection: Ontology evaluation on the real semantic web," in WWW 2006, Edinburgh, UK, May 2006. |
| [94] | L. Obrst, W. Ceusters, I. Mani, S. Ray, and B. Smith, "The evaluation of ontologies," in Semantic Web: Revolutionizing Knowledge Discovery in the Life Sciences, C. J. O. Baker and K.-H. Cheung, Eds. Springer, 2007, ch. 7, pp. 139-158. |
| [95] | L. Ding, R. Pan, T. Finin, A. Joshi, Y. Peng, and P. Kolari, "Finding and ranking knowledge on the semantic web," in The Semantic Web - ISWC 2005, ser. Lecture Notes in Computer Science, vol. 3729, 2005, pp. 156-170. |
| [96] | Y. Guo, A. Qasem, Z. Pan, and J. Heflin, "A requirements driven framework for benchmarking semantic web knowledge base systems," IEEE Trans Knowl Data Eng, vol. 19, no. 2, pp. 297-309, February 2007. |
| [97] | D. Greenbaum and M. Gerstein, "Semantic web standards: Legal and social issues and implications," in Semantic Web: Revolutionizing Knowledge Discovery in the Life Sciences, C. J. O. Baker and K.-H. Cheung, Eds. Springer, 2007, ch. 18, pp. 413-433. |
| [98] | M. Burstein, C. Bussler, T. Finin, M. N. Huhns, M. Paolucci, A. P. Sheth, S. Williams, and M. Zaremba, "A semantic web services architecture," IEEE Internet Comput, vol. 9, no. 5, pp. 72-81, Sept.-Oct. 2005. |
| [99] | R. Khare, "Microformats: The next (small) thing on the semantic web?" IEEE Internet Comput, vol. 10, no. 1, pp. 68-75, Jan-Feb 2006. |
| [100] | R. McCool, "Rethinking the semantic web. part 2," IEEE Internet Comput, vol. 10, no. 1, pp. 93-96, Jan.-Feb. 2006. |
| [101] | N. Shadbolt, W. Hall, and T. Berners-Lee, "The semantic web revisited," IEEE Intell Syst, vol. 21, no. 3, pp. 96-101, Jan.-Feb. 2006. |
| [102] | S. R. Eddy, "'Antedisciplinary' science," PLoS Comput Biol, vol. 1, no. 1, p. e6, June 2005. |
| [103] | M. F. Huerta, G. K. Farber, E. L. Wilder, D. V. Kleinman, P. A. Grady, D. A. Schwartz, and L. A. Tabak, "NIH roadmap interdisciplinary research initiatives." PLoS Comput Biol, vol. 1, no. 6, p. e59, November 2005. |
| [104] | D. Tapscott and A. D. Williams, Wikinomics: How Mass Collaboration Changes Everything. Portfolio, 2006. |
| [105] | K.-J. Lin, "Building web 2.0," IEEE Computer, vol. 40, no. 5, pp. 101-102, May 2007. |

| No. | Description |
|---|---|
| [106] | S. S. Sahoo, A. Sheth, B. Hunter, and W. S. York, "SemBOWSER: Adding semantics to biological web services registry," in Semantic Web: Revolutionizing Knowledge Discovery in the Life Sciences, C. J. O. Baker and K.-H. Cheung, Eds. Springer, 2007, ch. 14, pp. 318-340. |

What is claimed is:

1. A method for operating a distributed network system of internet client-server devices for resource metadata management, comprising:
- providing a metadata representation for each of a plurality of resources, wherein said each of the resources is an entity including an item comprising a unique uniform resource identifier (URI), a person, an organization, a publication, a product, an event, or an activity;
- registering said each of the resource entities at one of a plurality of registries, wherein said each of the registered resource entities is identified by a globally unique URI;
- publishing said each of the resource entities at one of a plurality of directories, wherein said each of the registered and identified resource entities is specified with a location and description;
- receiving two or more queries by a query parser,
- determining, by the query parser, at least one of the two or more queries is a non-semantic query and at least one of the remaining of queries is a semantic query;
- forwarding, by the query parser, the at least one non-semantic query to the registries, wherein the registries are configured to manage and publish non-semantic metadata;
- forwarding, by the query parser, the at least one remaining semantic query only to the directories, wherein the directories are configured to manage and publish semantic metadata, wherein the semantic metadata is in resource description framework (RDF) or web ontology language (OWL) format;
- identifying a metadata record within the metadata of the one of the registries for a selected resource entity of the resource entities in response to the at least non-semantic query;
- identifying a metadata record within the metadata of the one of the directories for the selected resource entity of the resource entities in response to the remaining semantic query;
- performing searching for the at least one non-semantic query for one or more of the resource entities across at least one of the registries to at least one of the directories;
- performing searching for the at least one remaining semantic query for one or more of the resource entities across at least one of the directories to at least one of the registries.

2. The method according to claim 1, wherein the semantic metadata is in a triple format equivalent to the RDF format via a mapping.

3. The method according to claim 1, wherein the non-semantic metadata is in free text, hypertext markup language (HTML), extensible markup language (XML), or non-triple format.

4. The method according to claim 1, further comprising:
- performing cross-linking between the resource entities via a mapping.

5. The method according to claim 1, further comprising:
- providing control of the distribution of the metadata records under a hierarchy of authoritative and non-authoritative servers in response to the at least non-semantic query or the remaining semantic query.

6. The method according to claim 5, wherein the hierarchy is configured to enable the administrator of each of the registries to maintain local control based on the policies and rules defined by the administrator.

7. The method according to claim 1, comprising:
- selecting an advertisement in response to a search performed at any of the registries or directories of said resource metadata management system;
- displaying the advertisement to a user;
- billing an advertiser associated with the advertisement.

8. The method according to claim 1, further comprising:
- selecting an advertisement by analyzing a content from a content provider in order to identify a set of one or more resources registered in said system that are most relevant to the advertisement;
- displaying the selected advertisement in proximity to the content from the content provider;
- billing an advertiser associated with the advertisement.

* * * * *